(12) United States Patent
Li

(10) Patent No.: US 9,215,088 B2
(45) Date of Patent: Dec. 15, 2015

(54) IDENTIFICATION OF APPLICATION SESSIONS

(75) Inventor: Gordon Yong Li, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 458 days.

(21) Appl. No.: 13/171,803

(22) Filed: Jun. 29, 2011

(65) Prior Publication Data

US 2013/0007193 A1    Jan. 3, 2013

(51) Int. Cl.
*H04L 12/28* (2006.01)
*H04L 12/46* (2006.01)

(52) U.S. Cl.
CPC ........ *H04L 12/2801* (2013.01); *H04L 12/2861* (2013.01); *H04L 12/2898* (2013.01); *H04L 12/4641* (2013.01)

(58) Field of Classification Search
None
See application file for complete search history.

(56) References Cited

U.S. PATENT DOCUMENTS

| | | | |
|---|---|---|---|
| 6,577,642 B1 * | 6/2003 | Fijolek et al. | 370/465 |
| 7,397,819 B2 * | 7/2008 | Kobayashi | 370/469 |
| 7,633,956 B1 * | 12/2009 | Parandekar et al. | 370/401 |
| 7,653,086 B2 * | 1/2010 | Beser | 370/468 |
| 7,748,002 B1 * | 6/2010 | Beser | 718/102 |
| 8,005,095 B2 * | 8/2011 | Emmendorfer et al. | 370/395.53 |
| 8,228,928 B2 * | 7/2012 | Parandekar et al. | 370/401 |
| 8,233,500 B2 * | 7/2012 | Beser | 370/468 |
| 8,346,947 B2 * | 1/2013 | Ajero et al. | 709/228 |
| 8,347,341 B2 * | 1/2013 | Markley et al. | 725/82 |
| 2002/0075805 A1 * | 6/2002 | Gupta et al. | 370/235 |
| 2002/0124111 A1 * | 9/2002 | Desai et al. | 709/246 |
| 2005/0123001 A1 * | 6/2005 | Craven et al. | 370/486 |
| 2005/0246754 A1 * | 11/2005 | Desai et al. | 725/118 |
| 2010/0235512 A1 * | 9/2010 | Beser | 709/226 |
| 2011/0116419 A1 * | 5/2011 | Cholas et al. | 370/259 |
| 2012/0215911 A1 * | 8/2012 | Raleigh et al. | 709/224 |

* cited by examiner

*Primary Examiner* — Greg C Bengzon
(74) *Attorney, Agent, or Firm* — Sterne, Kessler, Goldstein & Fox P.L.L.C.

(57) ABSTRACT

A system and method to associate a packet transmitted using a grant in a Multiple Grants per Interval (MGI) service flow with a corresponding application session that generated the packet is provided. The method includes the steps of receiving a packet and generating a first identifier that identifies the application session that generated the packet based on packet characteristics. The method further includes the step of mapping the first identifier to a second identifier based on a mapping function, inserting the second identifier into the packet, and transmitting the packet to a destination in the grant of the MGI service flow.

20 Claims, 6 Drawing Sheets

US 9,215,088 B2

IDENTIFICATION OF APPLICATION SESSIONS

BACKGROUND OF THE INVENTION

1. Field of the Invention

This application generally relates to multiple grants per interval (MGI) service flows.

2. Background Art

In communication system such as Data Over Cable Service Interface Specification (DOCSIS), packets are transmitted from a source, such as an application session that generated the packet, to a destination, such as network equipment, over a DOCSIS network. In an example, the packets are transmitted using MGI service flows. However, current systems do not provide a mechanism for an end-user at the destination to associate a received packet with an application session that generated the packet.

Methods and systems are needed to overcome the above mentioned deficiency

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

Figure 1:
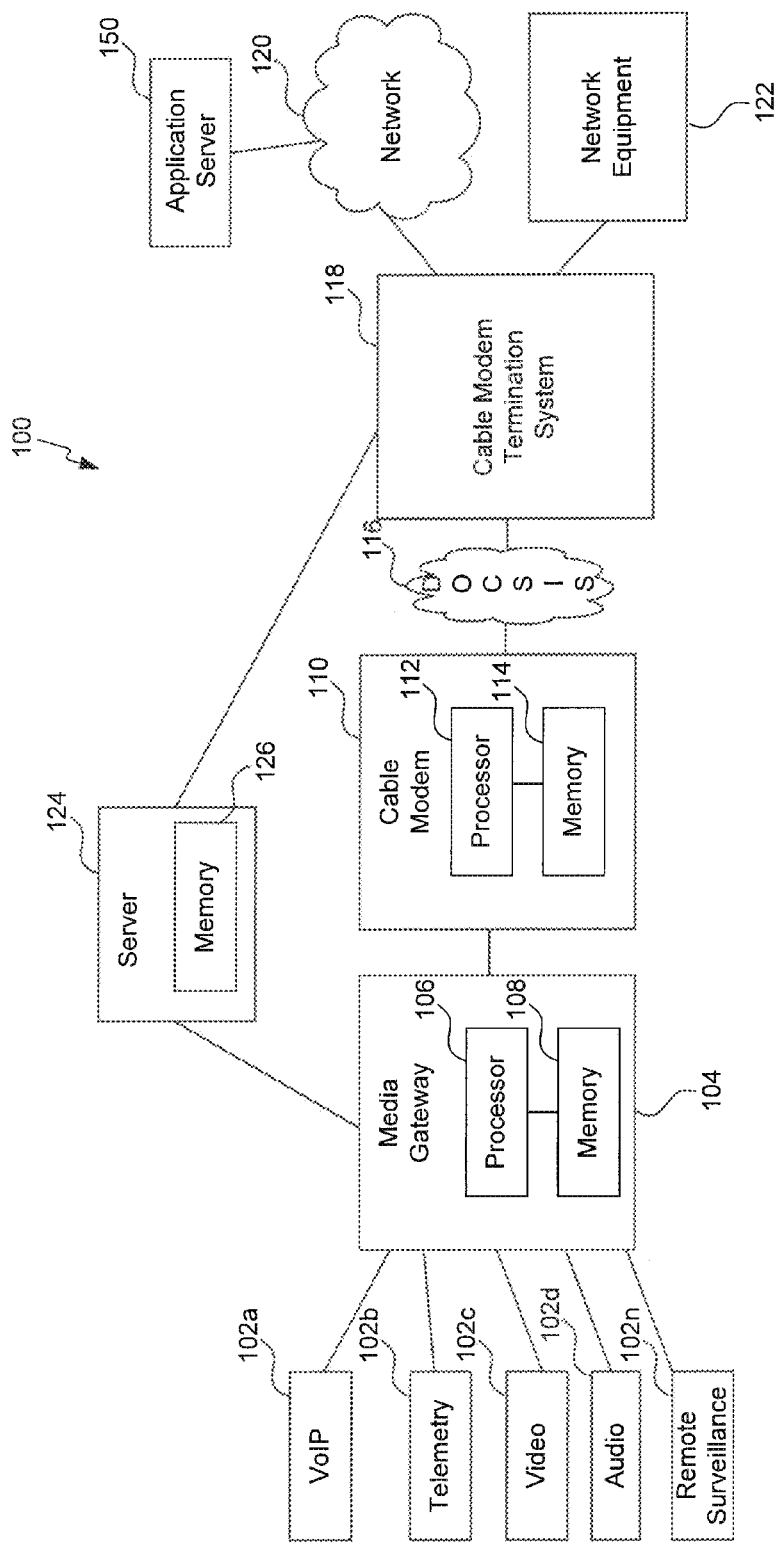
FIG. 1 illustrates an example communication system according to an embodiment of the invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Quality of Service (QoS) is a critical factor that impacts real-time applications such as voice-over-IP (VoIP) and video conferencing. As the use of such applications becomes widespread, it becomes difficult to guarantee QoS for each application session. Guaranteeing QoS for each application session is especially difficult if the QoS resources available on the access network are limited. One such example of an access network is based on the Data Over Cable Service Interface Specification (DOCSIS). QoS on a DOCSIS access link is realized by classifying traffic into different Service Flows (SF) that are associated with certain QoS parameters. For instance, in DOCSIS systems, packets for a VoIP call session are transmitted on an Unsolicited Grant Service (UGS) service flow that is associated with QoS parameters that guarantee a predetermined amount of bandwidth and periodic transmission opportunities for the call session.

The maximum number of service flows supported by a DOCSIS cable modem (CM) and a DOCSIS cable modem termination system (CMTS) is usually limited by the hardware and computational resources of the CM and CMTS. If one service flow is assigned to serve one VoIP call, then the maximum number of simultaneous VoIP call sessions supported by the CM is limited by the maximum number of service flows supported by the CM and the CMTS. For example, if the CM and CMTS can support 16 service flows at a time, then up to 16 simultaneous VoIP sessions may be supported. This limitation restricts the number of simultaneous application sessions that can be supported by the CM and CMTS. In particular, when the CM is deployed in an enterprise environment where the density of simultaneous VoIP calls is relatively high (e.g. over 100), the QoS for the each VoIP call may not be guaranteed since the simultaneous VoIP call sessions may not be allocated to dedicated SFs over a DOCSIS link.

Using a Multiple Grants per Interval (MGI) service flow, a CMTS can allocate multiple grants (also know as a "transmission opportunities") for a given grant interval (also known as a "transmission interval"). This potentially allows multiple applications sessions (e.g. VoIP calls) to be carried in a single service flow, and thus allows for QoS support for a number of application sessions that is greater than the maximum number of available service flows. One of the problems associated with MGI is that an end user that receives a packet on a MGI service flow is unable to associate a received packet with an application session that is generated by the packet. Embodiments presented herein and described further below, enable an end user that receives a packet from a MGI service flow to associate the packet with the service flow that generated the packet.

FIG. 1 illustrates an example communication system 100 according to an embodiment of the invention. System 100 includes media sources 102*a-n*, media gateway 104, cable modem 110, DOCSIS network 116, cable modem termination system 118, network equipment 122, network 120, application server 150, and server 124.

Media gateway 104 is coupled to media sources 102, cable modem 110 and server 124. Media sources may include, but are not limited to, Voice over Internet Protocol (VoIP) 102*a*, telemetry 102*b*, video 102*c*, audio 102*d*, remote surveillance 102*n* etc. Cable modem 110 is coupled to cable modem termination system 118 via DOCSIS network 116. Cable modem termination system 118 is coupled to network 120 and to network equipment 122.

Media gateway 104 includes a processor 106 coupled to a memory 108. Processor 106 based on instructions stored in memory 108 may perform the functions described herein as being performed by media gateway 104. Cable modem 110 includes a processor 112 coupled to a memory 114. Processor 112, based on instructions stored in memory 114, may perform the functions described herein as being performed by cable modem 110.

In an embodiment, media gateway 104 may be, for example, a router. In another embodiment, media gateway 104 may be integrated with cable modem 110 and the functions described herein as being performed by media gateway 104 may be performed by the cable modem 110 that is integrated with media gateway 104. Server 124 includes a memory 126 and is coupled to media gateway 104, cable modem termination system 1118, network 120 and network equipment 122. Application server 150 controls and manages different applications according to their respective protocols. For example, if application server 150 is a Session Initiation Protocol (SIP) application server, then it runs a SIP protocol to manage applications.

Each media source 102 includes an application client (not shown) that may generate and run one or more application sessions, each of which generate packets or frames that are transmitted by media gateway 104 to cable modem 110 and over DOCSIS network 116 to CMTS 118. For example, VoIP 102a may include multiple Internet Protocol (IP) phones (not shown), with each IP phone generating a corresponding VoIP application session and each VoIP application session generating corresponding packets that are transmitted to cable modem 110. Cable modem 110 classifies the packets according to DOCSIS classification rules and transmits the packets to CMTS 118 over DOCSIS network 116.

Figure 2:
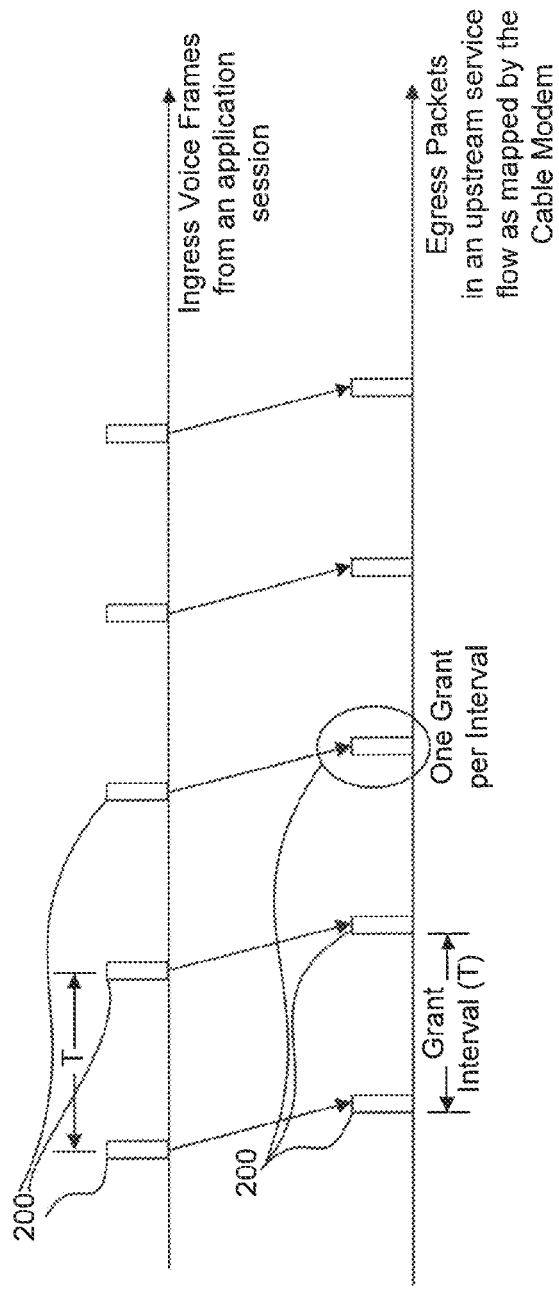
FIG. 2 illustrates an example implementation of a single grant per interval according to an embodiment of the invention.

FIG. 2 shows an example implementation of a single grant per interval according to an embodiment of the invention. In conventional systems, to guarantee quality of service (QoS), each packet 200, received by media gateway 104, corresponding to a particular application session, e.g. an incoming voice call, is transmitted by cable modem 110 in a single grant interval (T) of a unique service flow (SF) that has the required QoS attributes, e.g. guaranteed bandwidth and delay/jitter that allows periodic voice packets to be transmitted in corresponding periodic grants. In a single grant per interval implementation, as shown in FIG. 2, each packet 200 received by cable modem 110 is mapped to a single transmit opportunity allocated for the upstream service flow; that is, each packet 200 is transmitted in a single grant per grant interval (T).

Figure 3:
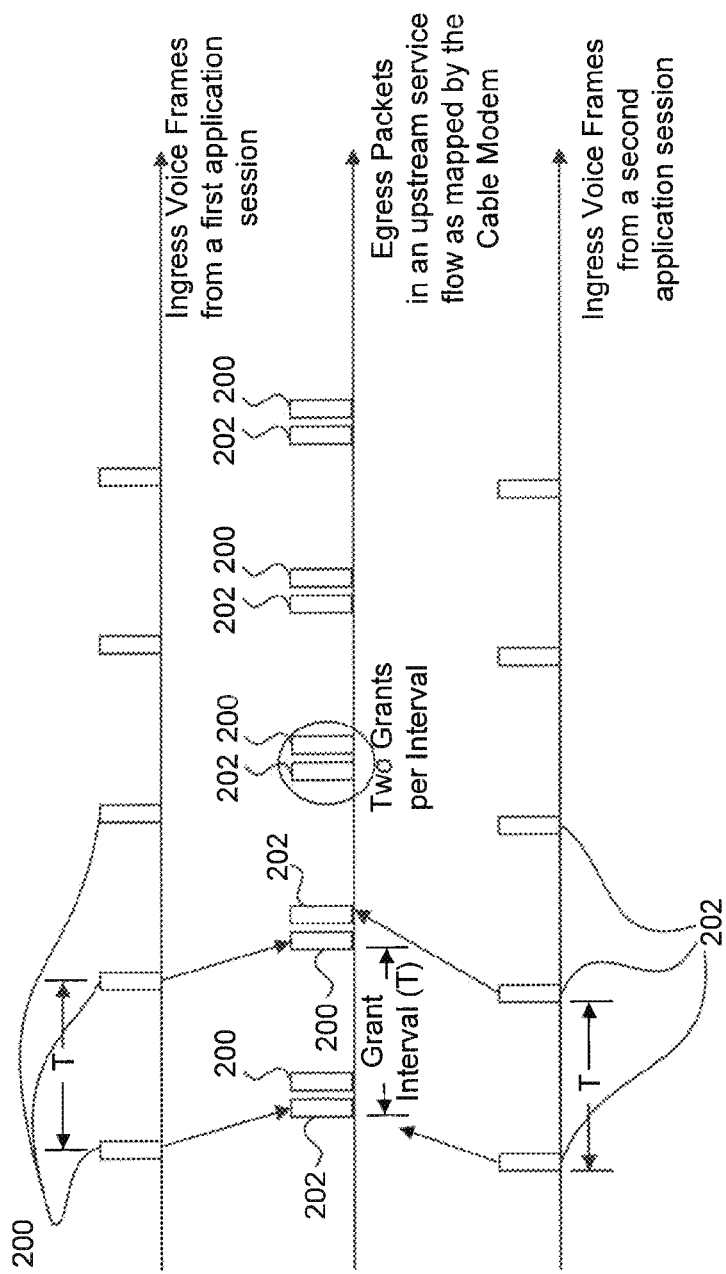
FIG. 3 illustrates an example implementation of multiple grants per interval (MGI) according to an embodiment of the invention.

FIG. 3 illustrates an example implementation of multiple grants per interval according to an embodiment of the invention.

Multiple grants per interval service flows may be utilized when cable modem 110 receives packets from multiple simultaneous application sessions for transmission to CMTS 118. The multiple application sessions may originate from one or more of media sources 102. For example, VoIP 102a may generate multiple simultaneous VoIP call sessions. In an MGI service flow, CMTS 118 allocates multiple grants or transmit opportunities per interval. This allows cable modem 110 to transmit multiple packets from multiple application sessions during a single grant interval T. In the example shown in FIG. 3, packets from two distinct application sessions are transmitted during the same grant interval T. For example, packets 200 from the first voice call and packets 202 from a second voice call are both transmitted during the same grant interval. However, cable modem 110 does not associate packets with the application session that generated the packet. Nor does cable modem 110 maintain a definite order of packets when transmitting multiple packets in an interval. For example, packet 202 from the second voice call may be transmitted before packet 200 of the first voice call in a first grant interval and the order may be reversed in a second grant interval. As a result, an end user in network 120 or network equipment 122 is unable to associate a packet with an application session that generated the packet. Currently there are no mechanisms that associate a packet with an application session that generated the packet. Furthermore, as the number of packets from different application sessions that are multiplexed into the same grant interval increases, it becomes even more difficult to associate a packet with an application session that generated the packet. For example, if test equipment 122 or a device in network 120 needs to determine which packet corresponds to which application session, it is not possible in conventional systems because there is no identifier associated with each packet that identifies whether the packet belongs to which application session. Embodiments of the invention presented herein, provide a method, system and computer program product to allow end user devices, such as devices in network 120 or network equipment 122 to associate a packet with an application session that generated the packet.

Figure 4:
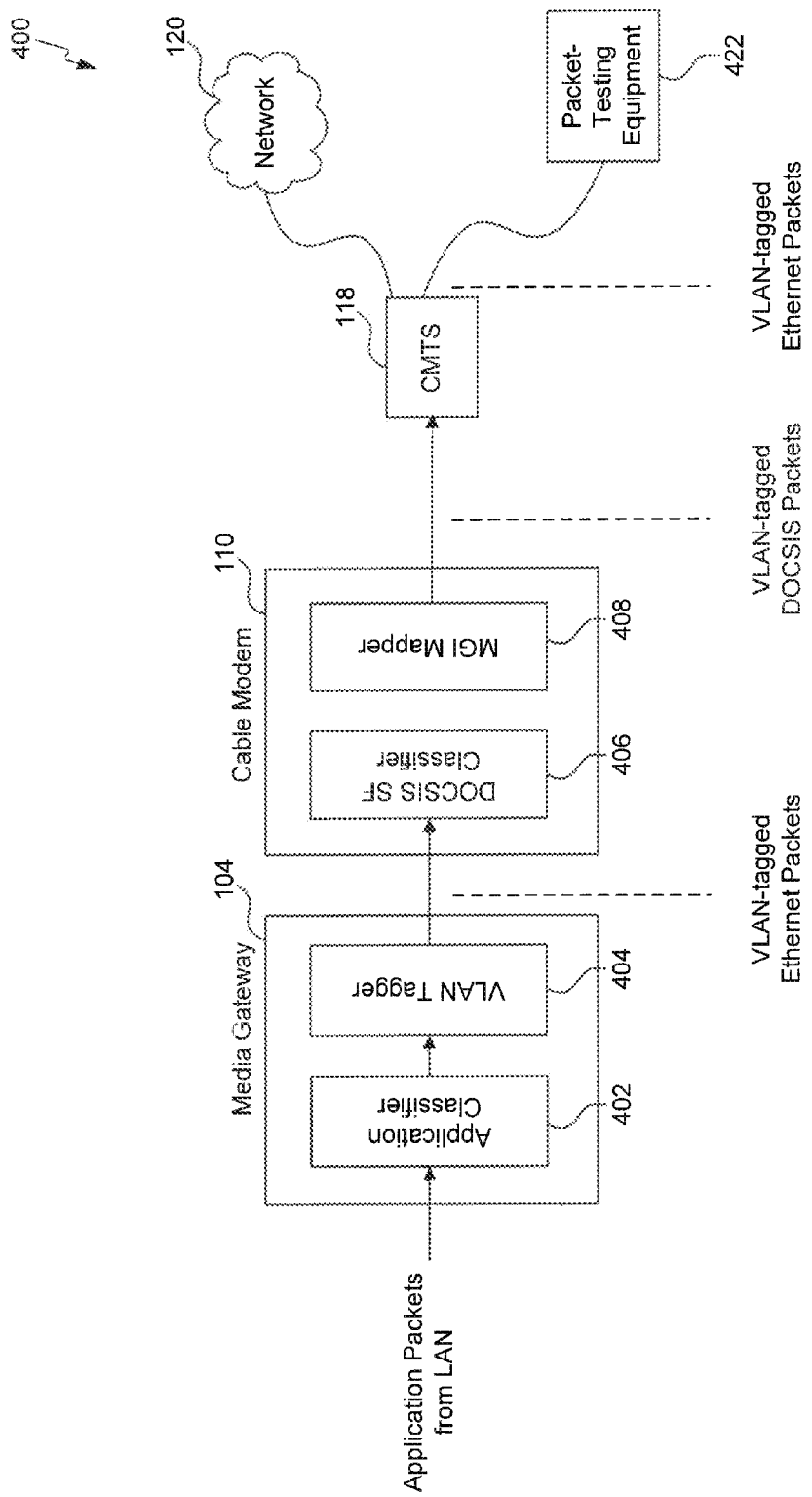
FIG. 4 illustrates an example system that associates a packet transmitted using a MGI service flow with a corresponding application session that generated the packet, according to an embodiment of the invention.

FIG. 4 illustrates an example system 400 that associates a packet with a corresponding application session that generated the packet, according to an embodiment of the invention.

Media gateway 104 may include, an application classification engine 402 coupled to a Virtual Local Area Network (VLAN) tagger 404. Cable modem 110 may include a DOCSIS service flow (SF) classifier 406 coupled to a MGI mapper 408. In an embodiment, application classifier 402, VLAN tagger 404, DOCSIS SF classifier 406 and MGM mapper 408 are implemented solely in hardware. In another embodiment, application classifier 402, VLAN tagger 404, DOCSIS service flow classifier 406 and MGI mapper 408 are implemented in software. For example, application classifier 402 and VLAN tagger 404 may be implemented as software running on processor 106 based on instructions stored in memory 108. DOCSIS service flow classifier 406 and MGI mapper 408 may be implemented as software running on processor 112 based on instructions stored in memory 114. In a further embodiment, application classifier 402, VLAN tagger 404, DOCSIS service flow classifier 406 and MGI mapper 408 are implemented as a combination of hardware and software.

According to an embodiment of the invention, application classifier 402 determines an application session that generated a packet using classification rules. The classification rules may be pre-programmed or pre-configured by a cable operator in memory 108 of media gateway 104. Alternatively, application classifier 402 may be aware of application sessions through monitoring of application session initiation control messages between the application client that is within media source 102 and the application server 150. Monitoring the application session control messages provides packet characteristics, including but not limited to the source address and source port number of the packet, the destination address and destination port number of the packet for an established application session. Based on the packet characteristics, application classifier 402 may generate an application session identifier (ASID) that identifies the application session that generated the packet. In another embodiment, the classification rules, which may include packet characteristics and the corresponding ASID, may be stored in memory 126 of server 124 and application classifier 402 may access the classification rules to determine which application session is to be associated with a particular packet.

Figure 5:
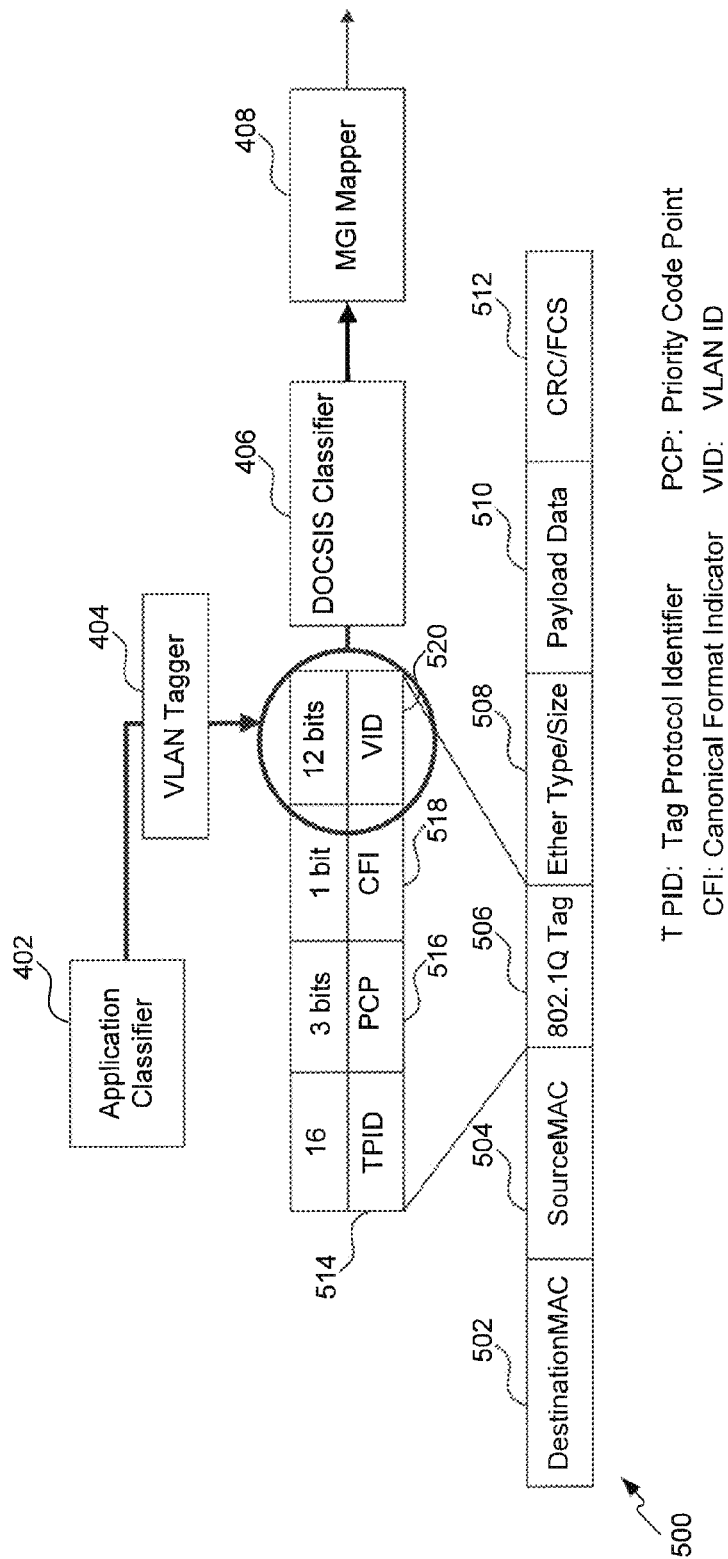
FIG. 5 illustrates generation and insertion of a tag that associates a packet with a corresponding application session that generated the packet according to an embodiment of the invention.

VLAN tagger 404 maps the ASID generated by application classifier 402 to a VLAN Identification (VID) and inserts the VID into the packet as shown in FIG. 5. If a VID already present in the packet is not equal to the VID mapped VLAN tagger 404, then VLAN tagger 404 replaces the VID present in the with the VID mapped by VLAN tagger 404. The ASID to VID mapping may be achieved by a pre-configured local look-up table that is stored in memory 108. Alternatively, the ASID to VID mapping may be stored in a table in memory 126 of server 124. In an alternate embodiment, the media gateway 104 may map the ASID to a VID in real-time. In another example, the ASID to VID mapping is determined dynamically or in real time based on querying server 124 or retrieving the mapping table from memory 126. In a further embodiment, in which media gateway 104 is integrated with cable modem 110, the mapping table may be stored in memory 114 of cable modem 110. For each packet received from the media gateway 104, DOCSIS classifier 406 of cable modem 110 performs DOCSIS specified classification procedures to map the packet into a particular grant of a MGI service flow. For each MGI service flow, the MGI mapper 408 schedules the transmission for the packet in a particular grant within the MGI interval. The DOCSIS classified packets, that include the VID, are sent to cable modem termination system 118. Cable modem termination system 118 forwards the packet to its destination in either network 120 or network equipment 122. In an embodiment, network equipment 122 may be part of network 120. At the destination, in either network 120 or network equipment 122, reverse mapping the VID to the ASID indicates the application session that generated the packet. For example, based on a look-up table in memory 126 of server 124, a destination of the packet may be able to determine the application session that generated a particular packet. Alternatively, the end user may have a locally stored copy of the mapping table that allows for reverse look up from the VID to ASID. Thus, the embodiments presented herein solve the problem of associating a packet with an application session that generated the packet.

FIG. 5 illustrates generation and insertion of a VID according to an embodiment of the invention.

FIG. 5 illustrates an Ethernet packet 500 that includes a destination media access control (MAC) address 502, a source MAC address 504, an 802.1Q tag 506, an Ethernet type/size field 508, a payload data field 510 and a Cyclic Redundancy Check (CkC)/Frame Check Sequence (FCS) field 512.

The 802.1Q tag 506 includes a Tag Protocol Identifier (TPID) 514, a priority code point field (PCP), a canonical format indicator (CFI) and a VID field 520. Based on the mapping of the ASID generated by application classifier 402 to a VID, VLAN tagger 404 inserts the VID into field 520. If a VID already present in field 520 is not equal to the VID mapped VLAN tagger 404, then VLAN tagger 404 replaces the VID present in field 520 with the VID mapped VLAN tagger 404. DOCSIS classifier 406 of cable modem 110 performs DOCSIS specified classification procedures to map the packet into a particular grant of a MGI service flow. For each MGI service flow, the MGI mapper 408 schedules the transmission for the packet in a particular grant within the MGI interval.

Figure 6:
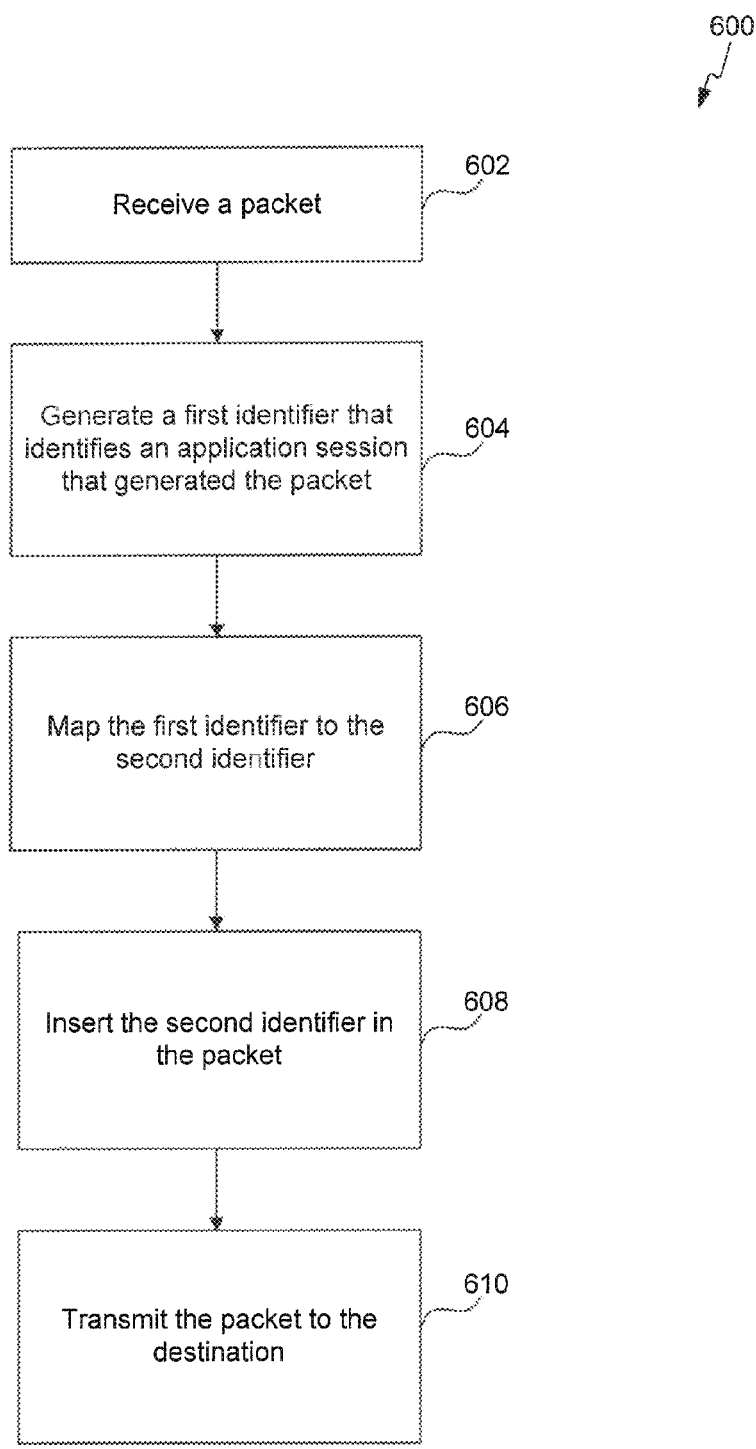
FIG. 6 is an example flowchart illustrating steps performed to associate a packet with a corresponding application session that generated the packet according to an embodiment of the invention.

FIG. 6 illustrates an example flowchart 600 illustrating steps performed to associate a packet transmitted using MGI grants with a corresponding application session that generated the packet according to an embodiment of the invention. The steps performed herein may be performed by one or more of, application classifier 402, VLAN tagger 404, processor 106 based on instructions stored in memory 108 or by processor 112 based on instructions stored in memory 114.

In step 602, a packet is received. For example, media gateway 104 may receive a packet from one of media sources 102a-n.

In step 604, a first identifier is generated that identifies an application session that generated the packet based on packet characteristics. For example, application classifier 402 may generate an ASID for the packet that identifies the application session that that generated the packet. The ASID may be based on application session initiation control messages and one or more of packet characteristics such as source address and port number, destination address and port number.

In step 606, the first identifier is mapped to a second identifier. For example, VLAN tagger 404 may either statically or dynamically map a first identifier such as the ASID to a second identifier such as the VID.

In step 608, the second identifier is inserted into the packet. For example, VLAN tagger 404 inserts the VID into field 520 of 802.1Q tag 506 of Ethernet packet 500. If a VID already present in field 520 is not equal to the VID mapped by VLAN tagger 404, then VLAN tagger 404 replaces the VID present in field 520 with the VID mapped by VLAN tagger 404.

In step 610, the packet is transmitted to its destination. For example, cable modem 110 maps the packet to a grant in a MGI service flow and transmits the packet to cable modem termination system 110.

Embodiments presented herein, or portions thereof, can be implemented in hardware, firmware, software, and/or combinations thereof. The embodiments presented herein apply to any communication system that utilizes packets for data transmission.

The representative packet processing functions described herein (e.g. functions performed by application classifier 402 or VLAN tagger 404 can be implemented in hardware, software, or some combination thereof. For instance, the method of flowchart 600 can be implemented using one or more of computer processors, such as processor 106 or 112, application classifier 402, VLAN tagger 404, computer logic, application specific circuits (ASIC), digital signal processors, etc., or any combination thereof, as will be understood by those skilled in the arts based on the discussion given herein. Accordingly, any processor that performs the functions described herein is within the scope and spirit of the embodiments presented herein.

Further, the packet processing functions described herein could be embodied by computer program instructions that are executed by a computer processor, for example processor 106 or 112, or any one of the hardware devices listed above. The computer program instructions cause the processor to perform the instructions described herein. The computer program instructions (e.g. software) can be stored in a computer usable medium, computer program medium, or any storage medium that can be accessed by a computer or processor. Such media include a memory device, such as instruction memory 108 and/or 114, a RAM or ROM, or other type of computer storage medium such as a computer disk or CD ROM, or the equivalent. Accordingly, any computer storage medium having computer program code that cause a processor to perform the functions described herein are within the scope and spirit of the embodiments presented herein.

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A media gateway configured to associate a packet transmitted using a grant in a Multiple Grants per Interval (MGI) service flow with a corresponding application session that generated the packet, the media gateway comprising:
   a memory; and
   a processor coupled to the memory and configured to:
      receive a packet;
      assign a first identifier that identifies the application session that generated the packet based on packet characteristics;
      map the first identifier to a second identifier based on a mapping function;
      insert the second identifier into the packet; and
      transmit the packet to a destination device in the grant of the MGI service flow via a cable modem, the cable modem being external to and separate from the media gateway.

2. The media gateway of claim 1, wherein the assigning the first identifier comprises:
   monitoring control messages between an application client and an application server to determine the packet characteristics;
   determining the application session that generated the packet based on the determined packet characteristics; and
   assigning the first identifier that identifies the application session that generated the packet.

3. The media gateway of claim 2, wherein the packet characteristics include one or more of a source address, a source port number, a destination addresses, or a destination port number.

4. The media gateway of claim 1, wherein the first identifier is determined based on one or more of session initiation control messages, a source address and a source port number of the packet, a destination address, or a destination port number of the packet.

5. The media gateway of claim 1, wherein the first identifier is an application session identifier (ASID) and the second identifier is a Virtual Local Area Network identification (VID).

6. The media gateway of claim 1, wherein the mapping function is a mapping table stored in the memory that maps the first identifier to the second identifier.

7. The media gateway of claim 1, wherein the second identifier is determined dynamically based on querying a server or a database that associates the first identifier with the second identifier.

8. The media gateway of claim 1, wherein the second identifier is inserted in a Virtual Local Area Network identification (VID) field in an Institute of Electrical and Electronics Engineers (IEEE) 802.1Q tag of the packet.

9. The media gateway of claim 1, wherein the received packet is an Ethernet packet.

10. The media gateway of claim 1, wherein the processor is further configured to insert a tag in the packet that includes a field that stores the second identifier.

11. The media gateway of claim 10, wherein the processor is further configured to replace a third identifier in the field with the second identifier if the third identifier is not equal to the second identifier.

12. The media gateway of claim 1, wherein the second identifier indicates the application session that generated the packet upon reverse-mapping the second identifier to the first identifier.

13. The media gateway of claim 12, wherein the second identifier is reverse-mapped to the first identifier based on a lookup table in a server.

14. The media gateway of claim 1, wherein the packet is transmitted over a Data Over Cable Service Interface Specification (DOCSIS) network to the destination device.

15. The media gateway of claim 1, wherein the destination device is a network, a cable modem termination system (CMTS) or network equipment.

16. A method performed by a media gateway to associate a packet transmitted using a grant in a Multiple Grants per Interval (MGI) service flow with a corresponding application session that generated the packet, the method comprising:
   receiving a packet;
   assigning a first identifier that identifies the application session that generated the packet based on packet characteristics;
   mapping the first identifier to a second identifier based on a mapping function;
   inserting the second identifier into the packet; and
   transmitting the packet to a destination device in the grant of the MGI service flow via a cable modem, the cable modem being external to and separate from the media gateway.

17. The method of claim 16, wherein the assigning further comprises:
   monitoring control messages between an application client and an application server to determine the packet characteristics;
   determining the application session that generated the packet based on the determined packet characteristics; and
   assigning the first identifier that identifies the application session that generated the packet.

18. The method of claim 17, wherein the packet characteristics include one or more of a source address, a source port number, a destination addresses, or a destination port number.

19. The method of claim 16, wherein the second identifier indicates the application session that generated the packet upon reverse-mapping the second identifier to the first identifier.

20. The method of claim 19, further comprising reverse-mapping the second identifier to the first identifier based on a lookup table in a server.

* * * * *